US011361191B2

(12) United States Patent
Lin et al.

(10) Patent No.: US 11,361,191 B2
(45) Date of Patent: Jun. 14, 2022

(54) ADVERSARIAL LEARNING FOR FINEGRAINED IMAGE SEARCH

(71) Applicant: eBay Inc., San Jose, CA (US)

(72) Inventors: Kevin Lin, Seattle, WA (US); Fan Yang, San Jose, CA (US); Qiaosong Wang, San Jose, CA (US); Robinson Piramuthu, Oakland, CA (US)

(73) Assignee: eBay Inc., San Jose, CA (US)

( * ) Notice: Subject to any disclaimer, the term of this patent is extended or adjusted under 35 U.S.C. 154(b) by 412 days.

(21) Appl. No.: 15/985,818

(22) Filed: May 22, 2018

(65) Prior Publication Data

US 2019/0362191 A1  Nov. 28, 2019

(51) Int. Cl.
*G06K 9/62* (2022.01)
*G06F 16/51* (2019.01)
(Continued)

(52) U.S. Cl.
CPC ........... *G06K 9/6263* (2013.01); *G06F 16/51* (2019.01); *G06F 16/532* (2019.01); *G06F 16/56* (2019.01);
(Continued)

(58) Field of Classification Search
CPC ...... G06K 9/6263; G06K 9/42; G06K 9/6215; G06K 9/6257; G06K 9/6269;
(Continued)

(56) References Cited

U.S. PATENT DOCUMENTS 6,859,802 B1 *  2/2005  Rui ..................... G06K 9/6215
7,660,468 B2     2/2010  Gokturk et al.
(Continued)

FOREIGN PATENT DOCUMENTS

CN  106874898 A  6/2017
WO  2019/226587 A1  11/2019

OTHER PUBLICATIONS

Qui et al., "Deep Semantic Hashing with Generative Adversarial Networks," ACM, pp. 225-234 (Year: 2017).*
(Continued)

*Primary Examiner* — John W Lee
(74) *Attorney, Agent, or Firm* — Holland & Hart LLP

(57) ABSTRACT

Disclosed are systems, methods, and non-transitory computer-readable media for using adversarial learning for finegrained image search. An image search system receives a search query that includes an input image depicting an object. The search system generates, using a generator, a vector representation of the object in a normalized view. The generator was trained based on a set of reference images of known objects in multiple views, and feedback data received from an evaluator that indicates performance of the generator at generating vector representations of the known objects in the normalized view. The evaluator including a discriminator sub-module, a normalizer sub-module, and a semantic embedding sub-module that generate the feedback data. The image search system identifies, based on the vector representation of the object, a set of other images depicting the object, and returns at least one of the other images in response to the search query.

20 Claims, 8 Drawing Sheets

(51) Int. Cl.
| | |
|---|---|
| *G06F 16/532* | (2019.01) |
| *G06F 16/56* | (2019.01) |
| *G06N 3/08* | (2006.01) |
| *G06V 20/00* | (2022.01) |
| *G06F 16/583* | (2019.01) |
| *G06V 10/32* | (2022.01) |

(52) U.S. Cl.
CPC ....... *G06F 16/5854* (2019.01); *G06K 9/6215* (2013.01); *G06K 9/6257* (2013.01); *G06K 9/6269* (2013.01); *G06N 3/088* (2013.01); *G06V 10/32* (2022.01); *G06V 2201/10* (2022.01)

(58) Field of Classification Search
CPC ............. G06K 2209/27; G06K 9/4628; G06K 9/00624; G06F 16/5854; G06F 16/51; G06F 16/532; G06F 16/56; G06N 3/088
See application file for complete search history.

(56) References Cited

U.S. PATENT DOCUMENTS

| | | | |
|---|---|---|---|
| 8,774,498 B2 | 7/2014 | De Campos et al. | |
| 8,774,515 B2 | 7/2014 | Mensink et al. | |
| 8,965,891 B1 | 2/2015 | Bengio et al. | |
| 9,514,391 B2 | 12/2016 | Perronnin et al. | |
| 9,626,594 B2 | 4/2017 | Soldevila et al. | |
| 10,628,481 B2* | 4/2020 | Kiapour | G06F 16/51 |
| 2005/0094879 A1* | 5/2005 | Harville | G06V 10/507 |
| | | | 382/209 |
| 2008/0270478 A1* | 10/2008 | Liu | G06F 16/583 |
| 2016/0379041 A1* | 12/2016 | Rhee | G06K 9/6271 |
| | | | 382/118 |
| 2017/0277693 A1 | 9/2017 | Mehedy et al. | |

OTHER PUBLICATIONS

Simoes et al., "Automatic Vehicle Classification Using Appearance Based Features", Master's Degree in Electrical and Computer Engineering, Sep. 2015, 87 pages.

International Search Report received for PCT Application No. PCT/US2019/033206, dated Aug. 21, 2019, 2 pages.

International Written Opinion received for PCT Application No. PCT/US2019/033206, dated Aug. 21, 2019, 6 pages.

Lin et al., "Adversarial Learning for Fine-grained Image Search", Retrieved from the Internet URL : <https://arxiv.org/pdf/1807.02247.pdf>, Jul. 6, 2018, 17 pages.

Bao et al., "CVAE-GAN: Fine-Grained Image Generation through Asymmetric Training", Retrieved from the Internet URL : https://arxiv org/pdf/1703.10155.pdf, Mar. 29, 2017, 10 pages.

Creswell et al., "Adversarial Training for Sketch Retrieval", BICV Group, Bioengineering, Imperial College London, Aug. 23, 2016, 13 pages.

Qiu et al., "Deep Semantic Hashing with Generative Adversarial Networks", SIGIR '17: Proceedings of the 40th International ACM SIGIR Conference on Research and Development in Information Retrieval, Aug. 7-11, 2017, 10 pages.

Song,"Binary Generative Adversarial Networks for Image Retrieval", Generative Adversarial Networks, Hashing, Image Retrieval, Aug. 8, 2017, 9 pages.

Wang et al., "IRGAN: A Minimax Game for Unifying Generative and Discriminative Information Retrieval Models", Computer Science, Information Retrieval, Cornell University, Feb. 22, 2018, 12 pages.

Wei et al., "Selective Convolutional Descriptor Aggregation for Fine-Grained Image Retrieval", IEEE Transactions on Image Processing (TIP), Jul. 13, 2017, 14 pages.

Yao et al., "One-Shot Fine-Grained Instance Retrieval", In Proceedings of ACM MM, Mountain View, Jul. 4, 2017, 9 pages.

Zheng et al., "Unlabeled Samples Generated by GAN Improve the Person Re-identification Baseline in vitro", Centre for Artificial Intelligence, University of Technology Sydney, Aug. 22, 2017, 9 pages.

International Preliminary Report on Patentability received for PCT Application No. PCT/US2019/033206, dated Dec. 3, 2020, 7 Pages.

\* cited by examiner

ADVERSARIAL LEARNING FOR
FINEGRAINED IMAGE SEARCH

TECHNICAL FIELD

An embodiment of the invention relates generally to search queries and, more specifically, to adversarial learning for fine-grained image search.

BACKGROUND

While computer executed image search has been extensively studied, it still remains a challenging problem. In particular, it is extremely difficult to identify images at a fine-grained level, where the goal is to find objects belonging to the same fine-grained category as the query, (e.g., identifying the make and model of cars). Numerous algorithms using deep neural networks have achieved state-of-the-art performance on fine-grained categorization, but they are not directly applicable to fine-grained image search. Current fine-grained categorization systems operate on a closed dataset containing a fixed number of categories, and thus do not properly handle unseen categories. Although classifiers can be re-trained to accommodate new categories, frequent retraining becomes prohibitively expensive as new data accumulates. In contrast, fine-grained image search by design should be aware of unseen categories that are not part of the training set.

In addition to emerging categories, view and pose variations of objects make finding correct fine-grained categories even harder. Classic approaches to address pose variations rely on matching local feature points, refining the homography, and inferring an explicit geometric transformation, but they are computationally expensive. Recent works based on deep neural networks introduce dedicated modules to learn specific geometric transformations for semantic correspondence, however, they require a predefined transformation type and a well-initialized transformation matrix to ensure reasonable performance. These types of systems cannot handle complex transformations, and are therefore, impractical for fine-grained image search given a growing database that contains unknown transformations.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Figure 1:
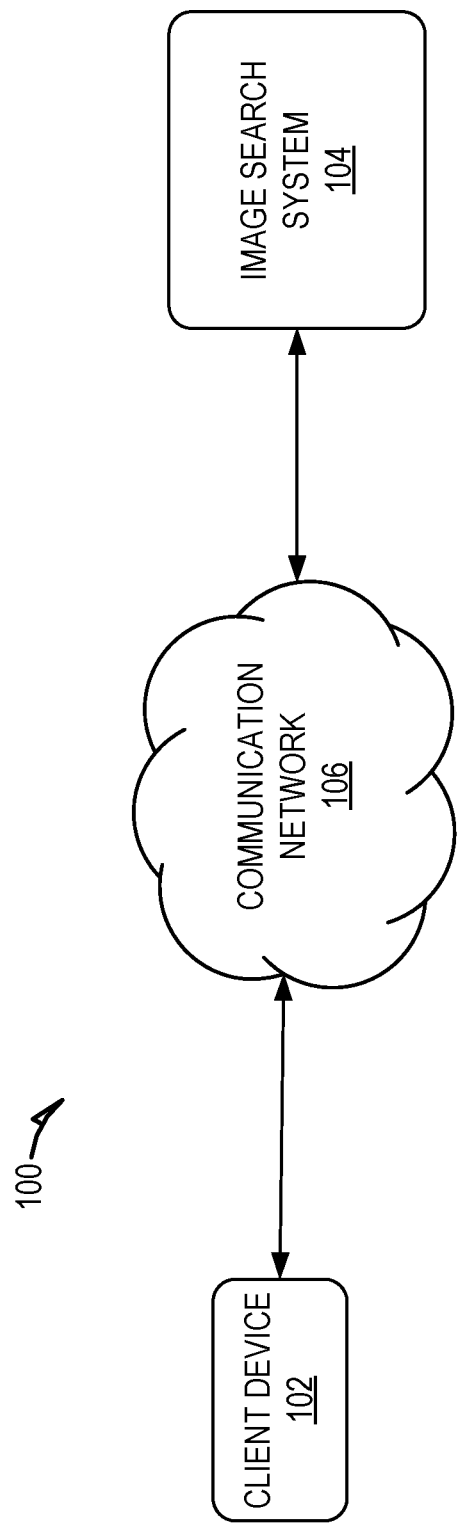
FIG. 1 shows a system configuration, wherein electronic devices communicate via a network for purposes of exchanging data, according to some example embodiments.

In the following description, for purposes of explanation, various details are set forth in order to provide a thorough understanding of various embodiments of the invention. It will be apparent, however, to one skilled in the art, that the present subject matter may be practiced without these specific details, or with slight alterations.

Reference in the specification to "one embodiment" or "an embodiment" means that a particular feature, structure or characteristic described in connection with the embodiment is included in at least one embodiment of the present subject matter. Thus, the appearances of the phrase "in one embodiment" or "in an embodiment" appearing in various places throughout the specification are not necessarily all referring to the same embodiment.

For purposes of explanation, specific configurations and details are set forth in order to provide a thorough understanding of the present subject matter. However, it will be apparent to one of ordinary skill in the art that embodiments of the subject matter described may be practiced without the specific details presented herein, or in various combinations, as described herein. Furthermore, well-known features may be omitted or simplified in order not to obscure the described embodiments. Various examples may be given throughout this description. These are merely descriptions of specific embodiments. The scope or meaning of the claims is not limited to the examples given.

Disclosed are systems, methods, and non-transitory computer-readable media for using adversarial learning for fine-grained image search. A generative adversarial network (GAN) is trained to generate image representations of objects by learning implicit transformations to normalize view and pose. The GAN includes a generator and an evaluator model that work together. The generator is trained to confuse the evaluator by producing high-quality features, while the evaluator aims to distinguish the features generated by the generator from the real ones by optimizing multiple learning goals.

In contrast to previous GANs that include a single discriminator that provides feedback to the generator, the evaluator consists of three sub-modules: a discriminator, a normalizer, and a semantic embedding module, that each evaluate the images generated by the generator and provide the generator with feedback. Each sub-module receives as input an image generated by the generator that depicts an object in a normalized view. The discriminator outputs a probability that the given input image is a real image or a generated image. The normalizer outputs a value indicating how well the image has been normalized into the normalized view. The semantic embedding module outputs a value indicating whether an object classification determined based on the input image matches a desired object classification of the object. The three sub-modules of the evaluator are jointly optimized together with the generator, so that they are balanced to contribute to a good resulting image representation.

Once trained, the GAN is used to conduct image searches based on a given input image of an object. The image search returns other generated images of the object. Initially, the GAN uses the input image to generate an image of the object in a normalized view. The GAN generates a vector representation based on the image of the object in the normalized view. A distance function is used to identify other vectors representing images of objects that are nearest to the generated vector representation. The images represented by the identified nearby vectors are returned in response to the image search.

FIG. 1 shows an example system configuration 100, wherein electronic devices communicate via a network for purposes of exchanging data, according to some example embodiments. As shown, multiple devices (i.e., a client device 102 and an image search system 104) are connected to a communication network 104 and configured to communicate with each other through use of the communication network 104. The communication network 104 is any type of network, including a local area network ("LAN"), such as an intranet, a wide area network ("WAN"), such as the Internet, or any combination thereof. Further, the communication network 104 may be a public network, a private network, or a combination thereof. The communication network 104 is implemented using any number of communication links associated with one or more service providers, including one or more wired communication links, one or more wireless communication links, or any combination thereof. Additionally, the communication network 104 is configured to support the transmission of data formatted using any number of protocols.

Multiple computing devices can be connected to the communication network 104. A computing device is any type of general computing device capable of network communication with other computing devices. For example, a computing device can be a personal computing device such as a desktop or workstation, a business server, or a portable computing device, such as a laptop, smart phone, or a tablet Personal Computer (PC). A computing device can include some or all of the features, components, and peripherals of the machine 800 shown in FIG. 8.

To facilitate communication with other computing devices, a computing device includes a communication interface configured to receive a communication, such as a request, data, etc., from another computing device in network communication with the computing device and pass the communication along to an appropriate processing module executing on the computing device. The communication interface also sends a communication (e.g., transmits data) to other computing devices in network communication with the computing device.

In the system 100, users interact with the image search system 104 to execute image search queries for images that are similar to an input image. For example, a user uses the client device 102 connected to the communication network 106 by direct and/or indirect communication to communicate with and utilize the functionality of the image search system 104. Although the shown system 100 includes only one client device 102, this is only for ease of explanation and is not meant to be limiting. One skilled in the art would appreciate that the system 100 can include any number of client devices 102.

The image search system 104 may concurrently accept connections from and interact with any number of client devices 102. The image search system 104 supports connections from a variety of different types of client devices 102, such as desktop computers; mobile computers; mobile communication devices, e.g. mobile phones, smart phones, tablets; smart televisions; set-top boxes; and/or any other network-enabled computing devices. Hence, the client device 102 may be of varying type, capabilities, operating systems, etc.

A user interacts with the image search system 104 via a client-side application installed on and executing at the client device 102. In some embodiments, the client-side application includes an image search system 104 specific component. For example, the component may be a stand-alone application, one or more application plug-ins, and/or a browser extension. However, the users may also interact with the image search system 104 via a third-party application, such as a web browser, that resides on the client device 102 and is configured to communicate with the image search system 104. In either case, the client-side application presents a user interface (UI) for the user to interact with the image search system 104. For example, the user interacts with the image search system 104 via a client-side application integrated with the file system or via a webpage displayed using a web browser application.

The image search system 104 comprises one or more computing devices configured to execute image search queries based on a provided input image, and return any identified images as search results. The image search system 104 can be a standalone system or integrated into other systems or services, such as being integrated into a website, web service, etc. For example, the image search system 104 may be integrated into an online marketplace website and used to identify additional pictures of an item listed for sale on the online marketplace website.

The image search system 104 enables a user to execute a search query for images maintained by the image search system 104 and/or images maintained by other data sources (not shown) in network communication with the image search system 104. The image search system 104 provides the user with a search interface that enables the user to provide an input image. For example, the input image may be of an object that the user is listing for sale on an online marketplace website.

In response to receiving the input image, the image search system 104 executes a search query based on the input image and identifies a set of similar images. The image search system 104 then returns some or all of the identified similar images in response to the search query.

The image search system 104 uses a GAN to both generate similar images and to execute the search query. The GAN is trained to generate image representations of objects by learning implicit transformations to normalize view and pose. The GAN includes a generator and an evaluator model that work together. The generator is trained to confuse the evaluator by producing high-quality features, while the evaluator aims to distinguish the features generated by the generator from the real ones by optimizing multiple learning goals.

In contrast to previous GANs that include a single discriminator that provides feedback to the generator, the evaluator consists of three sub-modules: a discriminator, a normalizer, and a semantic embedding module, that each evaluate the images generated by the generator and provide the generator with feedback. Each sub-module receives as input an image generated by the generator that depicts an object in a normalized view. The discriminator outputs a probability that the given input image is a real image or a generated image. The normalizer outputs a value indicating how well the image has been normalized into the normalized view. The semantic embedding module outputs a value indicating whether an object classification determined based on the input image matches a desired object classification of the object. The three sub-modules of the evaluator are jointly optimized together with the generator, so that they are balanced to contribute to a good resulting image representation.

Once trained, the image search system 104 uses the GAN to conduct an image search based on a given input image of an object, which returns other images of the object that were generated by the GAN. The image search system 104 provides the input image as input into the GAN, which generates an image of the object depicted in the input image in a normalized view. The GAN then generates a vector representation based on the image of the object in the normalized view. The image search system 104 uses a distance function to identify other vectors representing images of objects that are nearest to the generated vector representation. The image search system 104 then returns images represented by the identified nearby vectors in response to the image search.

Figure 2:
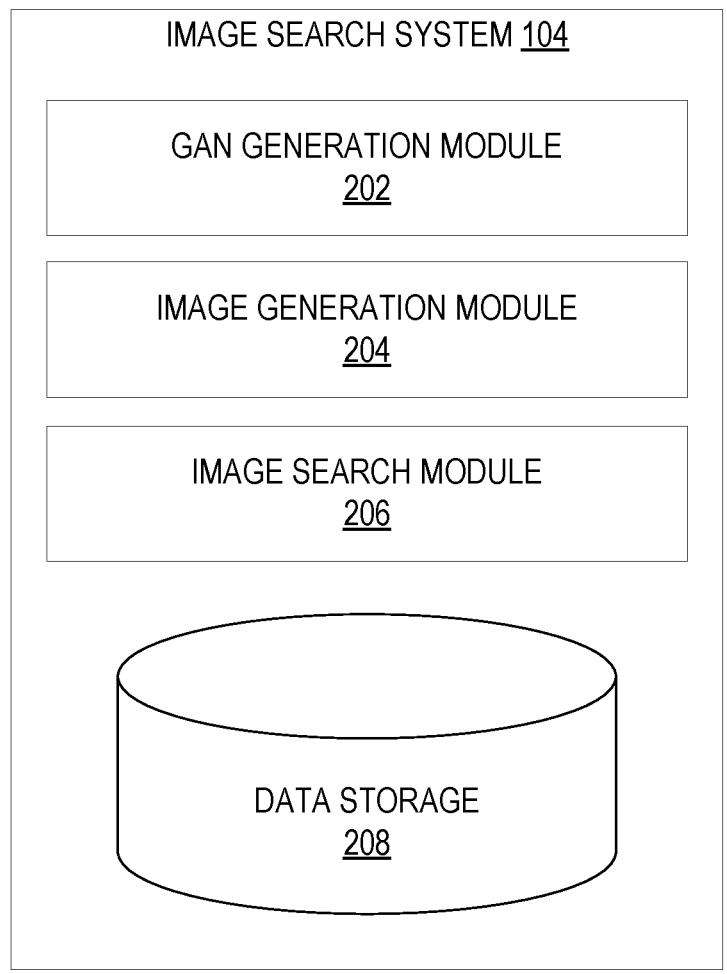
FIG. 2 is a block diagram of the image search system, according to some example embodiments.

FIG. 2 is a block diagram of the image search system 104, according to some example embodiments. To avoid obscuring the inventive subject matter with unnecessary detail, various functional components (e.g., modules) that are not germane to conveying an understanding of the inventive subject matter have been omitted from FIG. 2. However, a skilled artisan will readily recognize that various additional functional components may be supported by the search system 104 to facilitate additional functionality that is not specifically described herein. Furthermore, the various functional modules depicted in FIG. 2 may reside on a single computing device or may be distributed across several computing devices in various arrangements such as those used in cloud-based architectures.

As shown, the image search system 104 includes a GAN generation module 202, an image generation module 204, an image search module 206, and a data storage 208.

The GAN training module 202 trains a GAN that generates a vector representation for an image of an object in a normalized view. For example, the GAN receives as input an input image of an object, and outputs a vector representation of a generated image of the object in the normalized view. That is, the GAN generates an image of the object in the normalized view, and generates a vector representation of the generated image.

The GAN training module 202 trains the GAN to generate image representations of objects by learning implicit transformations to normalize view and pose. That is, the GAN training module 202 trains the GAN using a set of reference images of known objects. Each reference image includes metadata describing the image, including a categorization of the object depicted in the image. The GAN includes a generator and an evaluator that work together. The generator is trained to confuse the evaluator by producing high-quality features, while the evaluator aims to distinguish the features generated by the generator from real features by optimizing multiple learning goals.

In contrast to previous GANs that include a single discriminator that provides feedback to the generator, the evaluator consists of three sub-modules: a discriminator, a normalizer, and a semantic embedding module, that each evaluate the images generated by the generator and provide the generator with feedback. During training, each sub-module receives as input a vector representation of an image generated by the generator that depicts an object in a normalized view, and a real image of the object in a normalized view. The discriminator outputs a probability that the input image generated by the generator is a real image or a generated image. The normalizer outputs a value indicating how well the generated image has been normalized into the normalized view. The semantic embedding module outputs a value indicating whether an object classification determined based on the generated input image matches a desired object classification of the object. The three sub-modules of the evaluator are jointly optimized together with the generator, so that they are balanced to contribute to a high-quality resulting image representation.

Figure 3:
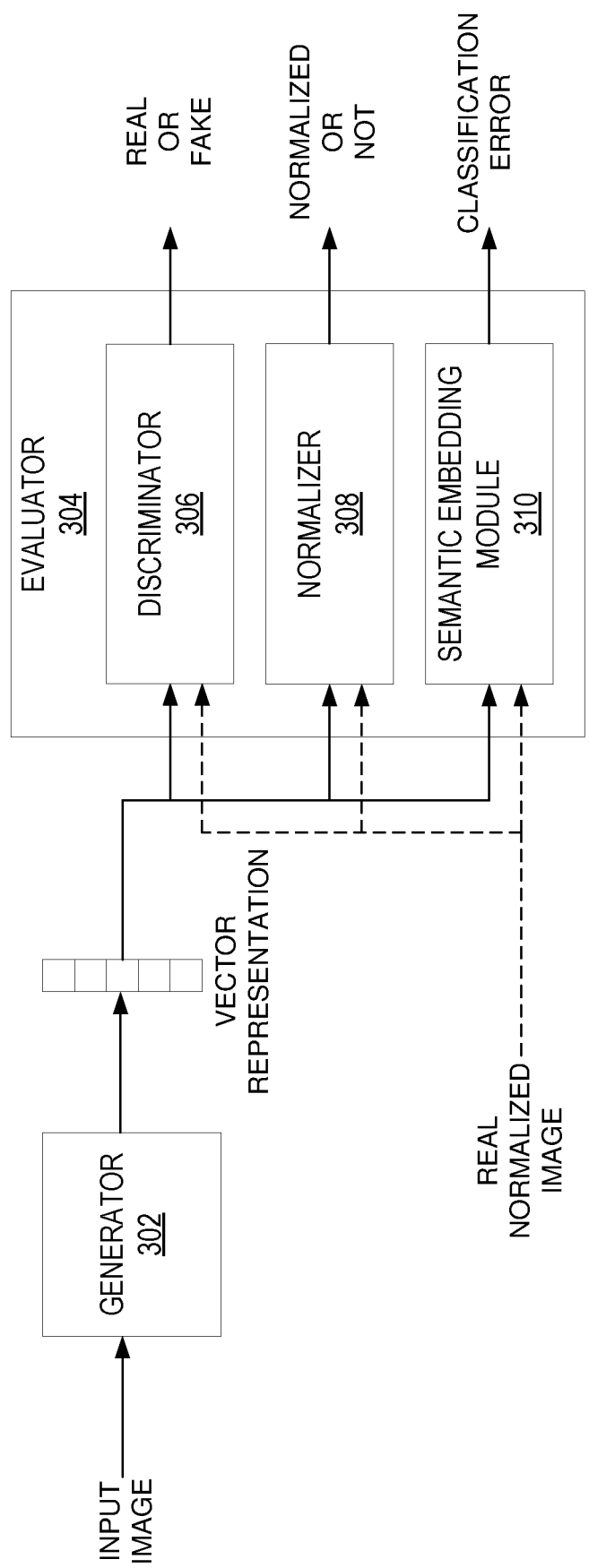
FIG. 3 is a block diagram of the Generative Adversarial Network (GAN), according to some example embodiments

FIG. 3 is a block diagram of the GAN 300, according to some example embodiments. As shown, the GAN 300 includes a generator 302 and an evaluator 304. The generator 302 and the evaluator 304 work with each other to generate high-quality image representations of objects in a normalized view. The normalized view can be any chosen view of an object, such as front-facing view of the object, however the normalized view is used for each image generated by the generator 302.

The generator 302 generates image representations (e.g., vectors) of objects in the normalized view, and the evaluator 304 analyzes the generated image representations to determine whether the image generated by the generator 302 is a real image of the object or a fake image generated by the generator 302. Additionally, the evaluator 304 provides feedback data to the generator 302 that indicates how the generated image can be improved to appear more like a real image. In this way, the GAN 300 functions similarly to other adversarial networks, however, the GAN 300 differs from other adversarial networks by utilizing multiple sub-modules in the evaluator 304. While traditional adversarial networks utilize a single discriminator to analyze and provide feedback data, the GAN 300 utilizes an evaluator with three sub-modules: a discriminator 306, a normalizer 308, and a semantic embedding module 310. Each sub-module evaluates the images generated by the generator 302 and provides the generator 302 with feedback regarding a different aspect of the generator's 302 performance generating the image.

During the training phase, the generator 302 receives an input image of an object, and outputs a vector representation of an image of the object in the normalized view. The input image of the object that is received by the generator 302 may be in any view or pose, however the vector representation output by the generator is of the object in the normalized view. The vector representation generated by the generator and a real image of the object in the normalized view are provided as input to each sub-module 306, 308 and 310, of the evaluator 304.

The discriminator 306 analyzes the input image generated by the generator 302 to determine how well the generated image depicts the object. That is, the discriminator 306 outputs a probability that the given input image is a real image or a generated image of the object. The value output by the discriminator 306 is a scalar probability indicating whether the given input image is a real image or a generated image representation. The higher the probability indicated by the output value, the greater the chance that the input image is a real image. Conversely, the lower the probability indicated by the output value, the greater the chance that the input image is a fake image of the object generated by the generator 302. The discriminator 306 uses a binary cross-entropy loss function that alternates between learning goals to distinguish a generated image representation from a real image.

The normalizer 308 analyzes the image representation generated by the generator 302 based on how well the generated image depicts the object in the normalized view. One of the challenges in fine-grained image search is that objects in images may appear in a high variation of viewpoints and poses. Accordingly, the generator 302 is trained to generate images of an object into a normalized view, which allows for better matching with other images. While the generator 302 is trained to convert an input image into a normalized view, the normalizer 308 is trained to distinguish the real image in the normalized view from the generated image in the normalized view.

The normalizer 308 outputs a value indicating how well the image has been normalized into the normalized view. For example, a higher output value indicates that the generator 302 has done a good job converting the input image into the normalized view, whereas a lower output value indicates that the generator 302 has not done a good job converting the input image into the normalized view.

The semantic embedding module 310 ensures that features of images from the same fine-grained category are semantically close to each other. The semantic embedding module 310 is initially trained with real images to capture the semantics in the feature space. The semantic embedding module 310 evaluates the quality of the generated representations by estimating the classification error. That is, the semantic embedding module 310 outputs a list of probabilities of whether an object determined based on the image generated by the generator 302 belongs to the list of given object categories. The desired object classification is known from the metadata associated with the input image of the object provided to the generator 302.

The three sub-modules 306, 308 and 310 of the evaluator 304 are jointly optimized together with the generator 302, so that they are balanced to contribute to a high-quality resulting image representation. The GAN training module 202 continues training the GAN 300 until the generator 302 and the evaluator 304 reach an equilibrium. That is the GAN 300 is trained until the three sub-modules 306, 308 and 310 of the evaluator 304 cannot successfully discern between the images generated by the generator 302 and the real images.

Returning to the discussion the FIG. 2, the image generation module 204 uses the GAN 300 to generate images of objects in the normalized view. That is, the image generation module 204 feeds the GAN 300 input images of know object, resulting in sets generated images of the objects in a normalized view. The generated images are stored in the data storage 208.

The image search module 206 executes an image search based on a given input image. That is, the image search module 206 receives an input image, identifies similar images of the same object, and returns the identified images. The image search module 206 uses the trained GAN 300 to generate a vector representation of the input image in the normalized view. The image search module 206 then determines the distance between the generated vector representation and vectors representing generated images stored in the data storage 208. For example, the image search module 206 determines the Euclidian distance between the generated vector representation and the other vectors. The image search module 206 identifies similar images based on the vectors that are determined to be nearest to the vector representation of the input image. The image search module 206 then returns one or more of the identified similar images in response to the image search query.

Figure 4:
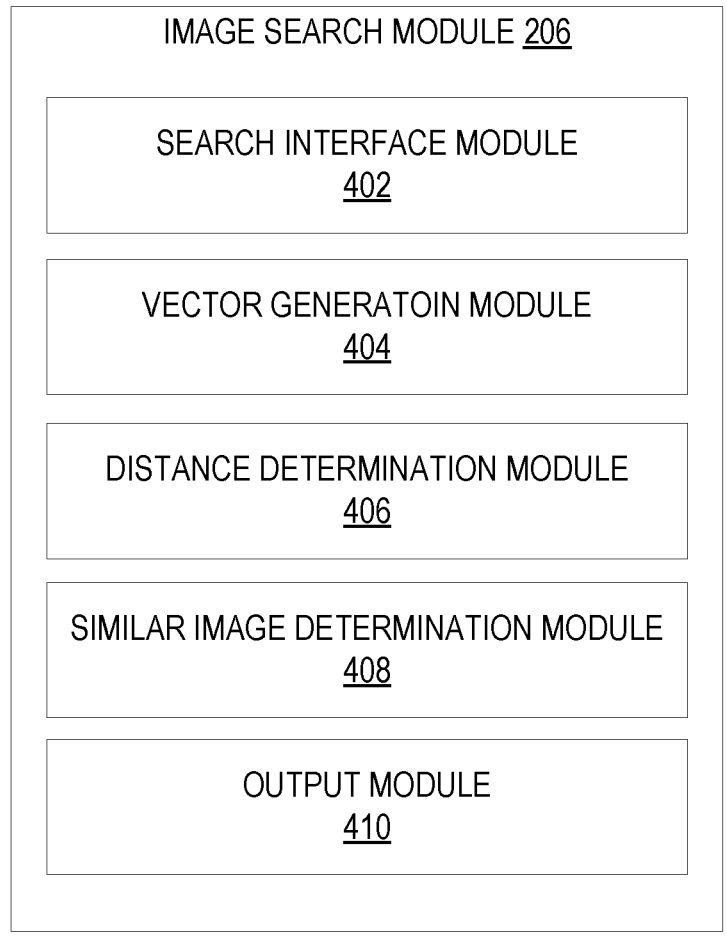
FIG. 4 is a block diagram of the image search module according to some example embodiments.

FIG. 4 is a block diagram of the image search module 206 according to some example embodiments. To avoid obscuring the inventive subject matter with unnecessary detail, various functional components (e.g., modules) that are not germane to conveying an understanding of the inventive subject matter have been omitted from FIG. 4. However, a skilled artisan will readily recognize that various additional functional components may be supported by the image search module 206 to facilitate additional functionality that is not specifically described herein. Furthermore, the various functional modules depicted in FIG. 4 may reside on a single computing device or may be distributed across several computing devices in various arrangements such as those used in cloud-based architectures.

As shown, the image search module 206 includes a search interface module 402, a vector generation module 404, a distance determination module 406, a similar image determination module 408, and an output module 410.

The search interface module 402 provides a user interface on a client device 102 that enables a user to execute an image search. The search interface includes user interface elements (e.g., text boxes, buttons, etc.) that enable a user of the client device 102 to enter an input image to execute the image search. The search interface module 402 receives inputs provided by a user of the client device 102 and provides the input to other modules of the image search module 402.

The vector generation module 404 generates a vector representation of an input image received from a user of the client device 102. The vector representation is of the image in the normalized view. For example, the input image may include an image of an object in any pose or view (e.g., side view, top view, etc.). The vector generation module 404 modifies the input image into the normalized view and generates a vector representation of the normalized image. The vector generation module 404 utilizes the trained generator 302 of the GAN 300 to generate the vector representation of the input image in the normalized view. For example, the vector generation module 404 uses the input image as input into the generator 302, which outputs the vector representation of the image in the normalized view.

The distance determination module 406 determines the distance between the vector representation of the input image and vector representations of other images stored in the data storage 208. The distance determination module 406 may use any distance algorithm to determine the distances between the vectors. For example, the distance determination module 406 may determine the Euclidian distance between the vectors.

The similar image determination module 408 determines similar images based on the determined distances between the vector representation of the input image and vector representations of other images stored in the data storage 208. For example, the similar image determination module 408 determines a subset of the vectors that are closest to the vector representation of the input image. The similar image determination module 408 may determine a predetermined number of closest vectors, such as the five closest vectors. As another example, the similar image determination module 408 identifies that is within a threshold distance of the vector representation of the input image.

The output module 410 gathers the identified similar images from the data storage 208 and provides them to the client device 102. The client device 102 presents the similar images on a screen of the client device 102 as search results.

Figure 5:
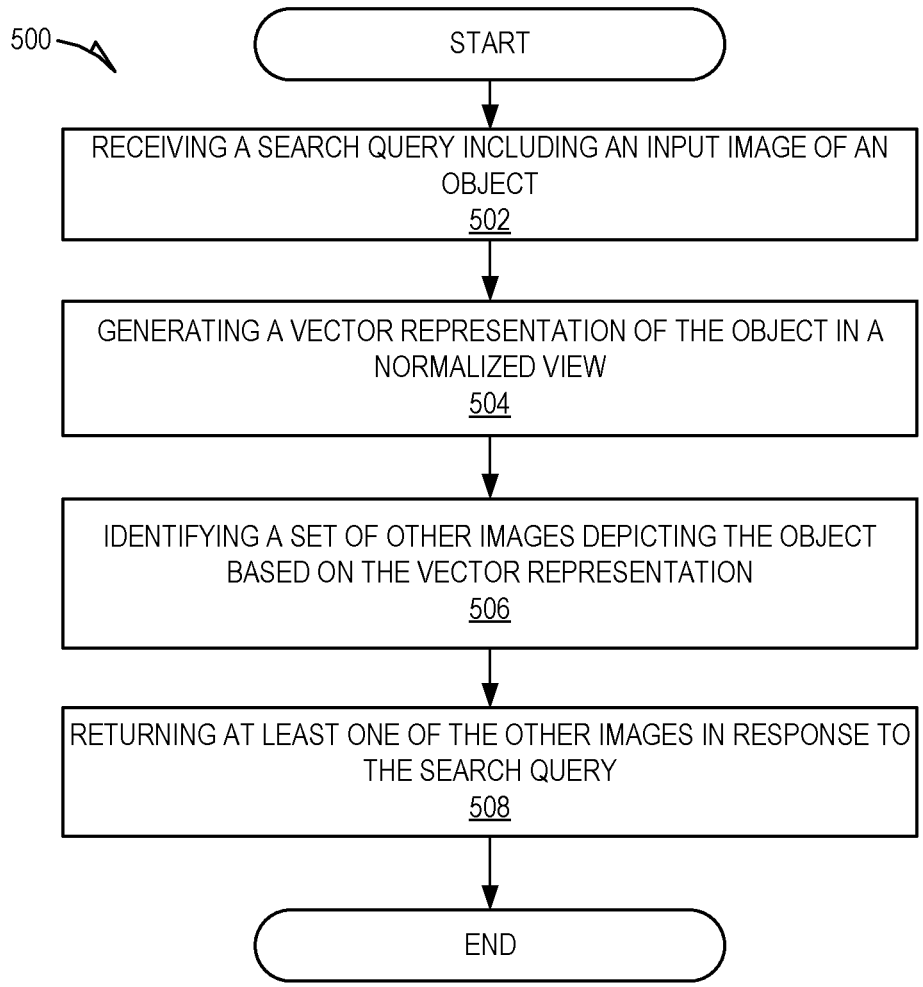
FIG. 5 is a flowchart showing an example method of executing an image search, according to certain example embodiments.

FIG. 5 is a flowchart showing an example method 500 of executing an image search, according to certain example embodiments. The method 500 may be embodied in computer readable instructions for execution by one or more processors such that the operations of the method 500 may be performed in part or in whole by the image search module 206; accordingly, the method 500 is described below by way of example with reference thereto. However, it shall be appreciated that at least some of the operations of the method 500 may be deployed on various other hardware configurations and the method 500 is not intended to be limited to the image search module 206.

At operation 502, the search interface 402 receives an input image of an object. The search interface module 402 provides a user interface on a client device 102 that enables a user to execute an image search. The search interface includes user interface elements (e.g., text boxes, buttons, etc.) that enable a user of the client device 102 to enter an input image to execute the image search.

At operation 504, the vector generation module 404 generates a vector representation of the object in a normalized view. The input image may include an image of an object in any pose or view (e.g., side view, top view, etc.). The vector generation module 404 modifies the input image into the normalized view and generates a vector representation of the normalized image. The vector generation module 404 utilizes the trained generator 302 of the GAN 300 to generate the vector representation of the input image in the normalized view. For example, the vector generation module 404 uses the input image as input into the generator 302, which outputs the vector representation of the image in the normalized view.

At operation 506, the distance determination module 406 and the similar image determination module 408 identify a set of other images depicting the object based on the vector representation. The distance determination module 406 determines the distance between the vector representation of the input image and vector representations of other images stored in the data storage 208. The distance determination module 406 may use any distance algorithm to determine the distances between the vectors. For example, the distance determination module 406 may determine the Euclidian distance between the vectors.

The similar image determination module 408 determines similar images based on the determined distances between the vector representation of the input image and vector representations of other images stored in the data storage 208. For example, the similar image determination module 408 determines a subset of the vectors that are closest to the vector representation of the input image. The similar image determination module 408 may determine a predetermined number of closest vectors, such as the five closest vectors. As another example, the similar image determination module 408 identifies that is within a threshold distance of the vector representation of the input image.

At operation 508, the output module 410 returns at least one of the other images in response to the search query. The output module 410 gathers the identified similar images from the data storage 208 and provides them to the client device 102. The client device 102 presents the similar images on a screen of the client device 102 as search results.

Figure 6:
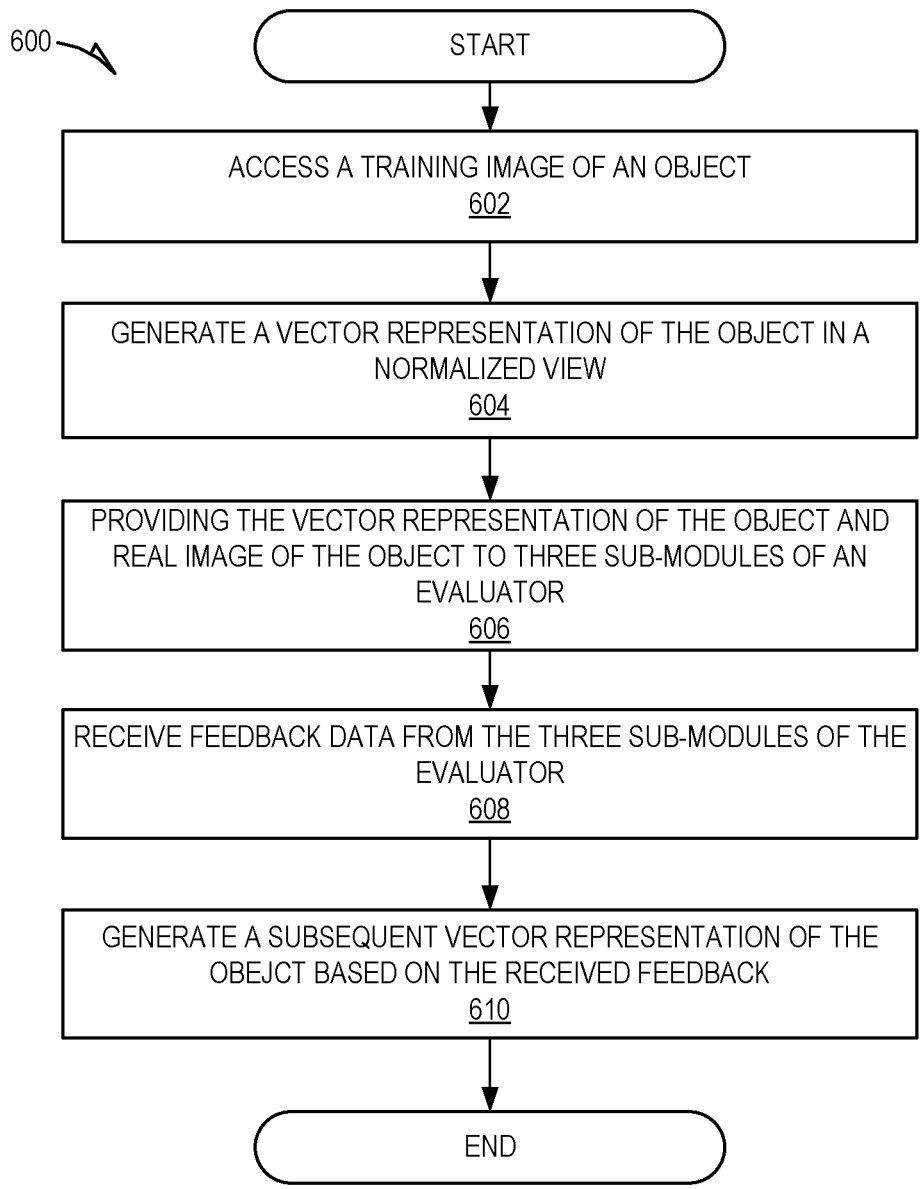
FIG. 6 is a flowchart showing an example method of generating a GAN for fine-grained image search, according to certain example embodiments.

FIG. 6 is a flowchart showing an example method of generating a GAN for fine-grained image search, according to certain example embodiments. The method 600 may be embodied in computer readable instructions for execution by one or more processors such that the operations of the method 600 may be performed in part or in whole by the image search module 206; accordingly, the method 600 is described below by way of example with reference thereto. However, it shall be appreciated that at least some of the operations of the method 600 may be deployed on various other hardware configurations and the method 600 is not intended to be limited to the image search module 206.

At operation 602, the generator 302 accesses a training image of an object. The input image of the object may be in any view or pose. For example, the image may depict the object in a side view, top view, etc.

At operation 604, the generator 302 generates a vector representation of the object in a normalized view. That is, the generator 302 generates an image of the object in the normalized view, and generates a vector representation of the generated image.

At operation 606, the GAN generation module 202 provides the vector representation of the object and a real image of the object to three sub-module 206, 208 and 210 of an evaluator 204. While traditional adversarial networks utilize a single discriminator to analyze and provide feedback data, the GAN 300 utilizes an evaluator with three sub-modules: a discriminator 306, a normalizer 308, and a semantic embedding module 310. Each sub-module evaluates the images generated by the generator 302 and provide the generator 302 with feedback regarding a different aspect of the generator's 302 performance generating the image.

The discriminator 306 analyzes the input image generated by the generator 302 to determine how well the generated image depicts the object. That is, the discriminator 306 outputs a probability that the given input image is a real image or a generated image of the object. The value output by the discriminator 306 is a scalar probability indicating whether the given input image is a real image or a generated image representation. The higher the probability indicated by the output value, the greater the chance that the input image is a real image. Conversely, the lower the probability indicated by the output value, the greater the chance that the input image is a fake image of the object generated by the generator 302. The discriminator 306 uses a binary cross-entropy loss function that alternates between learning goals to distinguish a generated image representation from a real image.

The normalizer 308 analyzes the image representation generated by the generator 302 based on how well the generated image depicts the object in the normalized view. One of the challenges in fine-grained image search is that objects in images may appear in a high variation of viewpoints and poses. Accordingly, the generator 302 is trained to generate images of an object into a normalized view, which allows for better matching with other images. While the generator 302 is trained to convert an input image into a normalized view, the normalizer 308 is trained to distinguish the real image in the normalized view from the generated image in the normalized view.

The normalizer 308 outputs a value indicating how well the image has been normalized into the normalized view. For example, a higher output value indicates that the generator 302 has done a good job converting the input image into the normalized view, whereas a lower output value indicates that the generator 302 has not done a good job converting the input image into the normalized view.

The semantic embedding module 310 ensures that features of images from the same fine-grained category are semantically close to each other. The semantic embedding module 310 is initially trained with real images to capture the semantics in the feature space. The semantic embedding module 310 evaluates the quality of the generated representations by estimating the classification error. That is, the semantic embedding module 310 outputs a list of probabilities of whether an object determined based on the image generated by the generator 302 belongs to the list of given object categories. The desired object classification is known from the metadata associated with the input image of the object provided to the generator 302

The three sub-modules 306, 308 and 310 of the evaluator 304 are jointly optimized together with the generator 302, so that they are balanced to contribute to a high-quality resulting image representation. Accordingly, at operation 608, the generator receives feedback data from the three sub-module 206, 208 and 210 of the evaluator 204, and at operation 610 the generator 302 generates a subsequent vector representation of the object based on the received feedback. This process may be repeated until the generator 302 and the evaluator 304 reach an equilibrium. That is the GAN 300 is trained until the three sub-modules 306, 308 and 310 of the evaluator 304 cannot successfully discern between the images generated by the generator 302 and the real images.

Software Architecture

Figure 7:
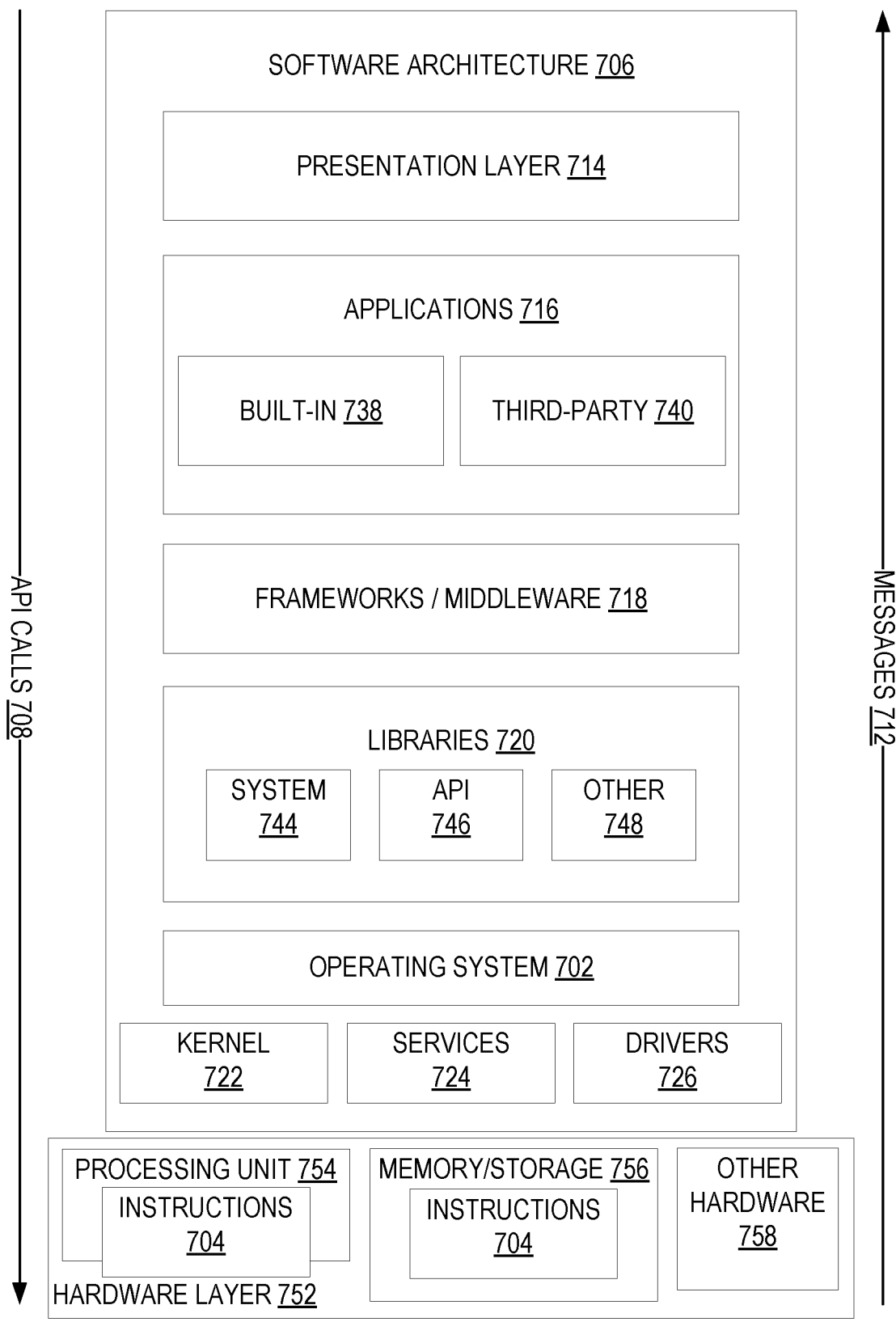
FIG. 7 is a block diagram illustrating a representative software architecture, which may be used in conjunction with various hardware architectures herein described.

FIG. 7 is a block diagram illustrating an example software architecture 706, which may be used in conjunction with various hardware architectures herein described. FIG. 7 is a non-limiting example of a software architecture 706 and it will be appreciated that many other architectures may be implemented to facilitate the functionality described herein. The software architecture 706 may execute on hardware such as machine 800 of FIG. 8 that includes, among other things, processors 804, memory 814, and (input/output) I/O components 818. A representative hardware layer 752 is illustrated and can represent, for example, the machine 800 of FIG. 8. The representative hardware layer 752 includes a processing unit 754 having associated executable instructions 704. Executable instructions 704 represent the executable instructions of the software architecture 706, including implementation of the methods, components, and so forth described herein. The hardware layer 752 also includes memory and/or storage modules memory/storage 756, which also have executable instructions 704. The hardware layer 752 may also comprise other hardware 758.

In the example architecture of FIG. 7, the software architecture 706 may be conceptualized as a stack of layers where each layer provides particular functionality. For example, the software architecture 706 may include layers such as an operating system 702, libraries 720, frameworks/middleware 718, applications 716, and a presentation layer 714. Operationally, the applications 716 and/or other components within the layers may invoke API calls 708 through the software stack and receive a response such as messages 712 in response to the API calls 708. The layers illustrated are representative in nature and not all software architectures have all layers. For example, some mobile or special purpose operating systems may not provide a frameworks/middleware 718, while others may provide such a layer. Other software architectures may include additional or different layers.

The operating system 702 may manage hardware resources and provide common services. The operating system 702 may include, for example, a kernel 722, services 724, and drivers 726. The kernel 722 may act as an abstraction layer between the hardware and the other software layers. For example, the kernel 722 may be responsible for memory management, processor management (e.g., scheduling), component management, networking, security settings, and so on. The services 724 may provide other common services for the other software layers. The drivers 726 are responsible for controlling or interfacing with the underlying hardware. For instance, the drivers 726 include display drivers, camera drivers, Bluetooth® drivers, flash memory drivers, serial communication drivers (e.g., Universal Serial Bus (USB) drivers), Wi-Fi® drivers, audio drivers, power management drivers, and so forth, depending on the hardware configuration.

The libraries 720 provide a common infrastructure that is used by the applications 716 and/or other components and/or layers. The libraries 720 provide functionality that allows other software components to perform tasks in an easier fashion than to interface directly with the underlying operating system 702 functionality (e.g., kernel 722, services 724 and/or drivers 726). The libraries 720 may include system libraries 744 (e.g., C standard library) that may provide functions such as memory allocation functions, string manipulation functions, mathematical functions, and the like. In addition, the libraries 720 may include API libraries 746 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 720 may also include a wide variety of other libraries 748 to provide many other APIs to the applications 716 and other software components/modules.

The frameworks/middleware 718 (also sometimes referred to as middleware) provide a higher-level common infrastructure that may be used by the applications 716 and/or other software components/modules. For example, the frameworks/middleware 718 may provide various graphic user interface (GUI) functions, high-level resource management, high-level location services, and so forth. The frameworks/middleware 718 may provide a broad spectrum of other APIs that may be used by the applications 716 and/or other software components/modules, some of which may be specific to a particular operating system 702 or platform.

The applications 716 include built-in applications 738 and/or third-party applications 740. Examples of representative built-in applications 738 may include, but are not limited to, a contacts application, a browser application, a book reader application, a location application, a media application, a messaging application, and/or a game application. Third-party applications 740 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 740 may invoke the API calls 708 provided by the mobile operating system (such as operating system 702) to facilitate functionality described herein.

The applications 716 may use built in operating system functions (e.g., kernel 722, services 724 and/or drivers 726), libraries 720, and frameworks/middleware 718 to create user interfaces to interact with users of the system. Alternatively, or additionally, in some systems, interactions with a user may occur through a presentation layer, such as presentation layer 714. In these systems, the application/component "logic" can be separated from the aspects of the application/component that interact with a user.

Figure 8:
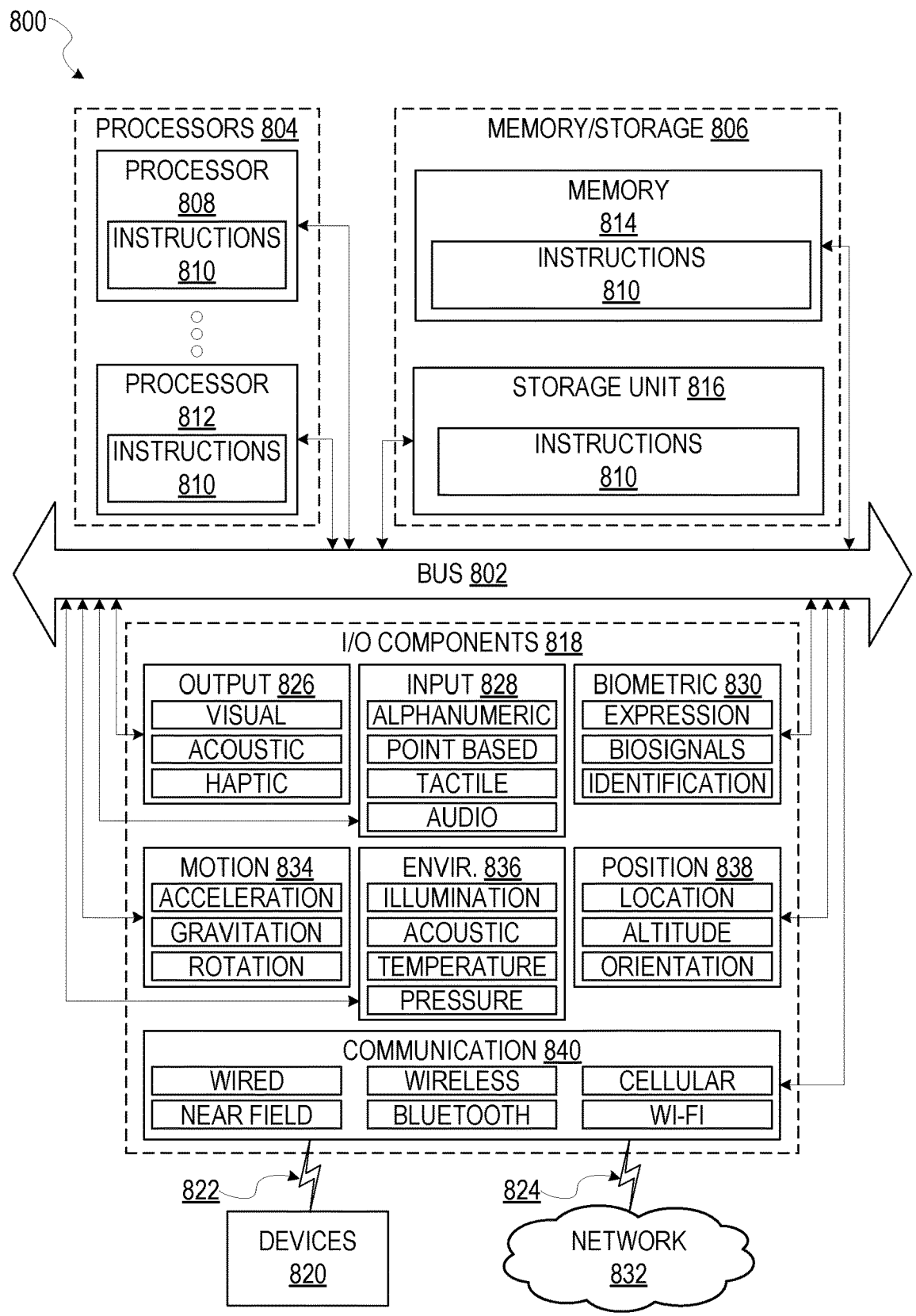
FIG. 8 is a block diagram illustrating components of a machine, according to some example embodiments, able to read instructions from a machine-readable medium (e.g., a machine-readable storage medium) and perform any one or more of the methodologies discussed herein.

FIG. 8 is a block diagram illustrating components of a machine 800, according to some example embodiments, able to read instructions 704 from a machine-readable medium (e.g., a machine-readable storage medium) and perform any one or more of the methodologies discussed herein. Specifically, FIG. 8 shows a diagrammatic representation of the machine 800 in the example form of a computer system, within which instructions 810 (e.g., software, a program, an application, an applet, an app, or other executable code) for causing the machine 800 to perform any one or more of the methodologies discussed herein may be executed. As such, the instructions 810 may be used to implement modules or components described herein. The instructions 810 transform the general, non-programmed machine 800 into a particular machine 800 programmed to carry out the described and illustrated functions in the manner described. In alternative embodiments, the machine 800 operates as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine 800 capable of executing the instructions 810, sequentially or otherwise, that specify actions to be taken by machine 800. Further, while only a single machine 800 is illustrated, the term "machine" shall also be taken to include a collection of machines that individually or jointly execute the instructions 810 to perform any one or more of the methodologies discussed herein.

The machine 800 may include processors 804, memory/storage 806, and I/O components 818, which may be configured to communicate with each other such as via a bus 802. The memory/storage 806 may include a memory 814, such as a main memory, or other memory storage, and a storage unit 816, both accessible to the processors 804 such as via the bus 802. The storage unit 816 and memory 814 store the instructions 810 embodying any one or more of the methodologies or functions described herein. The instructions 810 may also reside, completely or partially, within the memory 814, within the storage unit 816, within at least one of the processors 804 (e.g., within the processor's cache memory), or any suitable combination thereof, during execution thereof by the machine 800. Accordingly, the memory 814, the storage unit 816, and the memory of processors 804 are examples of machine-readable media.

The I/O components 818 may include a wide variety of components to receive input, provide output, produce output, transmit information, exchange information, capture measurements, and so on. The specific I/O components 818 that are included in a particular machine 800 will depend on the type of machine. For example, portable machines such as mobile phones will likely include a touch input device or other such input mechanisms, while a headless server machine will likely not include such a touch input device. It will be appreciated that the I/O components 818 may include many other components that are not shown in FIG. 8. The I/O components 818 are grouped according to functionality merely for simplifying the following discussion and the grouping is in no way limiting. In various example embodiments, the I/O components 818 may include output components 826 and input components 828. The output components 826 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 828 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 818 may include biometric components 830, motion components 834, environmental components 836, or position components 838 among a wide array of other components. For example, the biometric components 830 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 834 may include acceleration sensor components (e.g., accelerometer), gravitation sensor components, rotation sensor components (e.g., gyroscope), and so forth. The environmental components 836 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 838 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 818 may include communication components 840 operable to couple the machine 800 to a network 832 or devices 820 via coupling 824 and coupling 822, respectively. For example, the communication components 840 may include a network interface component or other suitable device to interface with the network 832. In further examples, communication components 840 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 820 may be another machine or any of a wide variety of peripheral devices (e.g., a peripheral device coupled via a USB).

Moreover, the communication components 840 may detect identifiers or include components operable to detect identifiers. For example, the communication components 840 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 840, such as, location via Internet Protocol (IP) geo-location, location via Wi-Fi® signal triangulation, location via detecting a NFC beacon signal that may indicate a particular location, and so forth.

Glossary

"CARRIER SIGNAL" in this context refers to any intangible medium that is capable of storing, encoding, or carrying instructions 810 for execution by the machine 800, and includes digital or analog communications signals or other intangible medium to facilitate communication of such instructions 810. Instructions 810 may be transmitted or received over the network 832 using a transmission medium via a network interface device and using any one of a number of well-known transfer protocols.

"CLIENT DEVICE" in this context refers to any machine 800 that interfaces to a communications network 832 to obtain resources from one or more server systems or other client devices. A client device may be, but is not limited to, a mobile phone, desktop computer, laptop, PDAs, smart phones, tablets, ultra books, netbooks, laptops, multi-processor systems, microprocessor-based or programmable consumer electronics, game consoles, STBs, or any other communication device that a user may use to access a network 832.

"COMMUNICATIONS NETWORK" in this context refers to one or more portions of a network 832 that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network 832 or a portion of a network 832 may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"MACHINE-READABLE MEDIUM" in this context refers to a component, device or other tangible media able to store instructions 810 and data temporarily or permanently and may include, but is not be limited to, random-access memory (RAM), read-only memory (ROM), buffer memory, flash memory, optical media, magnetic media, cache memory, other types of storage (e.g., erasable programmable read-only memory (EEPROM)), and/or any suitable combination thereof. The term "machine-readable medium" should be taken to include a single medium or multiple media (e.g., a centralized or distributed database, or associated caches and servers) able to store instructions 810. The term "machine-readable medium" shall also be taken to include any medium, or combination of multiple media, that is capable of storing instructions 810 (e.g., code) for execution by a machine 800, such that the instructions 810, when executed by one or more processors 804 of the machine 800, cause the machine 800 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors 804) may be configured by software (e.g., an application 716 or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor 804 or other programmable processor 804. Once configured by such software, hardware components become specific machines 800 (or specific components of a machine 800) uniquely tailored to perform the configured functions and are no longer general-purpose processors 804. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor 804 configured by software to become a special-purpose processor, the general-purpose processor 804 may be configured as respectively different special-purpose processors (e.g., comprising different hardware components) at different times. Software accordingly configures a particular processor or processors 804, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses 802) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors 804 that are temporarily configured (e.g., by software) or permanently configured to perform the relevant operations. Whether temporarily or permanently configured, such processors 804 may constitute processor-implemented components that operate to perform one or more operations or functions described herein. As used herein, "processor-implemented component" refers to a hardware component implemented using one or more processors 804. Similarly, the methods described herein may be at least partially processor-implemented, with a particular processor or processors 804 being an example of hardware. For example, at least some of the operations of a method may be performed by one or more processors 804 or processor-implemented components. Moreover, the one or more processors 804 may also operate to support performance of the relevant operations in a "cloud computing" environment or as a "software as a service" (SaaS). For example, at least some of the operations may be performed by a group of computers (as examples of machines 800 including processors 804), with these operations being accessible via a network 832 (e.g., the Internet) and via one or more appropriate interfaces (e.g., an API). The performance of certain of the operations may be distributed among the processors 804, not only residing within a single machine 800, but deployed across a number of machines 800. In some example embodiments, the processors 804 or processor-implemented components may be located in a single geographic location (e.g., within a home environment, an office environment, or a server farm). In other example embodiments, the processors 804 or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands," "op codes," "machine code," etc.) and which produces corresponding output signals that are applied to operate a machine 800. A processor 804 may be, for example, a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC) or any combination thereof. A processor may further be a multi-core processor having two or more independent processors 804 (sometimes referred to as "cores") that may execute instructions 810 contemporaneously.

What is claimed is:

1. A method comprising:
receiving a search query from a client device, the search query including an input image depicting an object;
modifying, using a generator, the input image into a normalized view;
generating, using the generator, a vector representation of the object in the normalized view, the generator having been trained based on a set of reference images of known objects in multiple views, and further based on feedback data received from an evaluator that indicates performance of the generator at generating vector representations of the known objects in the normalized view during a training phase, the feedback data comprising a first feedback data, a second feedback data, and a third feedback data, the evaluator including a discriminator sub-module to provide the first feedback data, a normalizer sub-module to provide the second feedback data, and a semantic embedding sub-module to provide the third feedback data;
identifying based on the vector representation of the object in the normalized view,
a set of other images depicting the object; and
returning, to the client device, at least one other image of the set of other images depicting the object in response to the search query.

2. The method of claim 1, wherein the discriminator sub-module receives, from the generator, a generated image of a known object in the normalized view and outputs the first feedback data comprising a probability that the generated image is a real image of the known object.

3. The method of claim 2, wherein the normalizer sub-module receives, from the generator, the generated image of the known object in the normalized view and outputs the second feedback data comprising a value indicating how well the generated image of the known object has been converted to the normalized view.

4. The method of claim 3, wherein the semantic embedding sub-module receives, from the generator, the generated image of the known object in the normalized view and outputs the third feedback data comprising a value indicating whether an object classification determined based on the generated image matches a desired object classification of the known object.

5. The method of claim 4, wherein the generator modifies generation of future images based on the feedback data received from the discriminator sub-module, the normalizer sub-module, and the semantic embedding sub-module.

6. The method of claim 1, wherein identifying the set of other images depicting the object comprises:
  determining, using a distance function, distances between the vector representation of the object and a set of vector representations of images depicting objects; and
  identifying, based on the distances, a subset of vector representations of the set of vector representations that are closest to the vector representation of the object, the subset of vector representations that are closest to the vector representation of the object representing the set of other images depicting the object.

7. The method of claim 6, wherein the set of other images includes images generated by the generator.

8. A system comprising:
  one or more computer processors; and
  one or more machine-readable mediums storing instructions that, when executed by the one or more computer processors, cause the system to perform operations comprising:
    receiving a search query from a client device, the search query including an input image depicting an object;
    modifying, using a generator, the input image into a normalized view;
    generating, using the generator, a vector representation of the object in the normalized view, the generator having been trained based on a set of reference images of known objects in multiple views, and further based on feedback data received from an evaluator that indicates performance of the generator at generating vector representations of the known objects in the normalized view during a training phase, the feedback data comprising a first feedback data, a second feedback data, and a third feedback data, the evaluator including a discriminator sub-module to provide the first feedback data, a normalizer sub-module to provide the second feedback data, and a semantic embedding sub-module to provide the third feedback data;
    identifying based on the vector representation of the object in the normalized view, a set of other images depicting the object; and
    returning, to the client device, at least one other image of the set of other images depicting the object in response to the search query.

9. The system of claim 8, wherein the discriminator sub-module receives, from the generator, a generated image of a known object in the normalized view and outputs the first feedback data comprising a probability that the generated image is a real image of the known object.

10. The system of claim 9, wherein the normalizer sub-module receives, from the generator, the generated image of the known object in the normalized view and outputs the second feedback data comprising a value indicating how well the generated image of the known object has been converted to the normalized view.

11. The system of claim 10, wherein the semantic embedding sub-module receives, from the generator, the generated image of the known object in the normalized view and outputs the third feedback data comprising a value indicating whether an object classification determined based on the generated image matches a desired object classification of the known object.

12. The system of claim 11, wherein the generator modifies generation of future images based on the feedback data received from the discriminator sub-module, the normalizer sub-module, and the semantic embedding sub-module.

13. The system of claim 8, wherein identifying the set of other images depicting the object comprises:
  determining, using a distance function, distances between the vector representation of the object and a set of vector representations of images depicting objects; and
  identifying, based on the distances, a subset of vector representations of the set of vector representations that are closest to the vector representation of the object, the subset of vector representations that are closest to the vector representation of the object representing the set of other images depicting the object.

14. The system of claim 13, wherein the set of other images includes images generated by the generator.

15. A non-transitory computer-readable storage medium storing instructions that, when executed by one or more computer processors of a computing device, cause the computing device to perform operations comprising:
  receiving a search query from a client device, the search query including an input image depicting an object;
  modifying, using a generator, the input image into a normalized view;
  generating, using the generator, a vector representation of the object in the normalized view, the generator having been trained based on a set of reference images of known objects in multiple views, and further based on feedback data received from an evaluator that indicates performance of the generator at generating vector representations of the known objects in the normalized view during a training phase, the feedback data comprising a first feedback data, a second feedback data, and a third feedback data, the evaluator including a discriminator sub-module to provide the first feedback data, a normalizer sub-module to provide the second feedback data, and a semantic embedding sub-module to provide the third feedback data that generate the feedback data;
  identifying based on the vector representation of the object in the normalized view, a set of other images depicting the object; and
  returning, to the client device, at least one other image of the set of other images depicting the object in response to the search query.

16. The non-transitory computer-readable storage medium of claim 15, wherein the discriminator sub-module receives, from the generator, a generated image of a known object in the normalized view and outputs the first feedback data comprising a probability that the generated image is a real image of the known object.

17. The non-transitory computer-readable storage medium of claim 16, wherein the normalizer sub-module receives, from the generator, the generated image of the known object in the normalized view and outputs the second feedback data comprising a value indicating how well the generated image of the known object has been converted to the normalized view.

18. The non-transitory computer-readable storage medium of claim 17, wherein the semantic embedding sub-module receives, from the generator, the generated image of the known object in the normalized view and outputs the third feedback data comprising a value indicating whether an object classification determined based on the generated image matches a desired object classification of the known object.

19. The non-transitory computer-readable storage medium of claim 18, wherein the generator modifies generation of future images based on the feedback data received from the discriminator sub-module, the normalizer sub-module, and the semantic embedding sub-module.

20. The non-transitory computer-readable storage medium of claim 15, wherein identifying the set of other images depicting the object comprises:
- determining, using a distance function, distances between the vector representation of the object and a set of vector representations of images depicting objects; and
- identifying, based on the distances, a subset of vector representations of the set of vector representations that are closest to the vector representation of the object, the subset of vector representations that are closest to the vector representation of the object representing the set of other images depicting the object, wherein the set of other images includes images generated by the generator.

* * * * *